United States Patent [19]

Bellettiere et al.

[11] 4,311,625
[45] Jan. 19, 1982

[54] WATER-BORNE SURFACE-COATING COMPOSITIONS CONTAINING COMPLEXED COBALT DRIERS

[75] Inventors: Samuel J. Bellettiere, Piscataway; Raymond Hurley, New Brunswick, both of N.J.; Samuel Hoch, Brooklyn, N.Y.

[73] Assignee: Tenneco Chemicals, Inc., Saddle Brook, N.J.

[21] Appl. No.: 205,834

[22] Filed: Nov. 10, 1980

[51] Int. Cl.³ .................. C08L 91/00; C08L 67/06
[52] U.S. Cl. ................................ 260/22 R; 106/264; 106/310; 260/22 CB; 260/29.2 TN; 260/29.2 UA; 260/29.2 E
[58] Field of Search ........... 260/22 R, 22 CB, 29.2 E, 260/29.2 UA, 29.2 TN; 106/310, 264; 525/17

[56] References Cited

U.S. PATENT DOCUMENTS

| | | | |
|---|---|---|---|
| 3,243,309 | 3/1966 | Phillips et al. | 106/264 |
| 3,723,152 | 3/1973 | Alkaitis | 106/310 |
| 3,901,837 | 8/1975 | Gottesman et al. | 260/22 R |
| 4,175,064 | 11/1979 | Landau et al. | 260/22 CA |
| 4,224,202 | 9/1980 | Heiberger | 260/22 CB |
| 4,225,477 | 9/1980 | Vasishth et al. | 260/29.2 TN |

*Primary Examiner*—Theodore E. Pertilla
*Attorney, Agent, or Firm*—Evelyn Berlow

[57] ABSTRACT

Water-borne surface-coating compositions comprise an oxidizable organic film-forming resinous vehicle and a drier system that comprises a cobalt salt-potassium salt complex and that has a total metal content of 5% to 14% by weight. The drier system may also contain other metal salts, e.g., calcium salts and zirconium salts of monocarboxylic acids.

10 Claims, No Drawings

WATER-BORNE SURFACE-COATING COMPOSITIONS CONTAINING COMPLEXED COBALT DRIERS

This invention relates to water-borne surface-coating compositions. More particularly, it relates to surface-coating compositions that comprise an oxidizable organic film-forming resinous vehicle, water, and a drier system that contains complexed cobalt.

Metal salts of organic acids have long been used in surface-coating compositions that contain alkyd resins and other oxidizable resinous vehicles to accelerate the drying process and to promote the polymerization of the vehicles to dry, cross-linked coatings. The most commonly used drier systems contain an active drier metal that is usually cobalt or manganese and an auxiliary drier metal that is calcium, barium, zinc, zirconium, lead, bismuth, lanthanum, or a mixture of these metals.

In water-borne surface-coating compositions in which an alkyd resin or other oxidizable resinous vehicle has been neutralized with ammonia or an amine to a pH in the range of 7 to 10 to improve its water-dispersibility, cobalt salt-containing drier systems have been found to be unsatisfactory in that they do not provide the necessary rapid drying and hardening and in that coating compositions that contain them exhibit a loss of drying rate on aging.

Various additives have been used to increase the activity of cobalt salt-containing drier systems in water-borne surface-coating compositions, but none has proven to be entirely satisfactory. Some do not promote sufficiently the drying and hardening of films of the coating compositions, others do not prevent an increase in the drying time of the compositions on aging, and still others are far too expensive to use in the amounts necessary to accelerate the drying and hardening of the compositions. For example, 1,10-phenanthroline, 2,2'-bipyridine, 2-pyridinealdazine, and 8-hydroxyquinoline are effective accelerators for cobalt salt driers, but they are too expensive to use in the amounts needed to improve the drying characteristics of the surface-coating compositions and they promote discoloration of the compositions. Hydrazines have also been proposed as activators for drier systems used in water-borne surface-coating compositions, but they are usually not sufficiently active and they cause extreme discoloration, surface wrinkling, and deterioration of films of the compositions.

It has now been found that water-borne surface-coating compositions containing oxidizable organic film-forming resinous vehicles that have excellent drying characteristics result when the drier system that is used in their preparation comprises a cobalt salt-potassium salt complex. The compositions that contain these drier systems are stable as is shown by the fact that they undergo little or no change in drying rate, viscosity, and pH on aging at room temperature. Films prepared from these surface-coating compositions have excellent color, gloss, water-resistance, and other physical properties. In addition, the drier systems that comprise the cobalt salt-potassium salt complexes are more readily incorporated in water-borne surface-coating compositions that the conventional cobalt salt-containing drier systems. A further advantage of the novel surface-coating compositions is that they are less costly to produce than the corresponding compositions that contain the previously-used drier systems.

The cobalt salt-potassium salt complexes that are major components of the drier systems of this invention are products of the reaction of one mole of a cobalt salt of a monocarboxylic acid with two moles of a potassium salt of a monocarboxylic acid in a solvent mixture that contains both polar and non-polar solvents. The preparation and properties of these metal salt complexes are disclosed in detail in U.S. Pat. No. 4,175,064, which is incorporated herein by reference.

The cobalt salts and the potassium salts from which the complexes are produced are derived from organic monocarboxylic acids that have from 2 to 24 carbon atoms. The useful acids include saturated and unsaturated aliphatic, aromatic, and alicyclic monocarboxylic acids, for example, acetic acid, hexanoic acid, n-octanoic acid, 2-ethylhexanoic(octoic) acid, nonanoic acid, isononanoic acid, decanoic acid, isodecanoic acid, neodecanoic acid, lauric acid, myristic acid, stearic acid, arachidic acid, behenic acid, oleic acid, linoleic acid, erucic acid, benzoic acid, p-tert.butylbenzoic acid, salicylic acid, ricinoleic acid, α-hydroxystearic acid, monobutyl maleate, monodecyl phthalate, cyclopentanoic acid, cyclohexanoic acid, cycloheptanoic acid, and methylcyclohexanoic acid. It is generally preferred that cobalt and potassium salts of aliphatic monocarboxylic acids having 8 to 12 carbon atoms or alicyclic monocarboxylic acids having 5 to 7 carbon atoms be used in the preparation of the complexes. Particularly advantageous results have been obtained using a complex derived from cobalt octoate (2-ethylhexanoate) and potassium octoate (2-ethylhexanoate).

The drier systems of this invention are solutions comprising a cobalt salt-potassium salt complex in a solvent in which both the metal salts and the complex are soluble. Suitable solvents are mixtures that contain 20% to 80% preferably 40% to 60% by weight of one or more polar solvents and 20% to 80% preferably 40% to 60% by weight of one or more non-polar solvents. The solvent mixtures preferably contain an alkanol having 3 to 20 carbon atoms, such as propanol, butanol, hexanol, n-octanol, 2-ethylhexanol, n-decanol, isodecanol, 2-ethyloctanol, tridecanol, or tetradecanol; a hydrocarbon having 5 to 20 carbon atoms, preferably mineral spirits, and minor amounts of water, monocarboxylic acids and/or glycol ethers, for example, diethylene glycol, polypropylene glycol, or monobutyl ether of diethylene glycol.

The drier systems are prepared by combining the cobalt and potassium salts and the solvent mixture in amounts that will form a solution that contains at least two moles of potassium per mole of cobalt and that has a total metal content of from 5% to 14% and preferably from 8% to 12% by weight. In addition to the cobalt salt-potassium salt complex and solvent mixture, the drier systems may also contain metal salts, surfactants, and other additives.

In a preferred embodiment of the invention, the cobalt salt-potassium salt complex is the only metal-containing component of the drier system. When used in water-borne surface-coating compositions containing alkyd resins or other oxidizable vehicles, these drier systems impart good drying characteristics initially and after aging to the compositions at a relatively low cost without adversely affecting their color, gloss, or other physical properties. These drier systems are ordinarily used in water-borne surface-coating compositions in amounts that will provide from 0.075% to 0.375% by weight of cobalt and from 0.125% to 0.625% by weight of potassium, based on the weight of resinous vehicle in the composition. They are preferably used in amounts that will provide from 0.10% to 0.25% by weight of cobalt and from 0.15% to 0.40% by weight of potassium, based on the weight of the resinous vehicle in the composition.

In another preferred embodiment of the invention, the drier system contains both the cobalt salt-potassium salt complex and at least one auxiliary drier metal salt, such as a calcium salt, a zinc salt or a zirconium salt. They preferably contain the cobalt salt-potassium salt complex, a calcium salt, and a zirconium salt. The auxiliary drier metal salts are derived from aliphatic branched-chain monocarboxylic acids having 6 to 24 carbon atoms, cycloaliphatic monocarboxylic acids having 6 to 10 carbon atoms, or mixtures thereof; they are preferably derived from aliphatic branched-chain monocarboxylic acids having 8 to 18 carbon and/or naphthenic acids. When these drier systems are incorporated in water-borne surface-coating compositions in amounts that will provide 0.075% to 0.375% by weight of cobalt, 0.125% to 0.625% by weight of potassium, 0.02% to 0.30% by weight of calcium, and 0.02% to 0.30% by weight of zirconium and preferably in amounts that will provide 0.10% to 0.25% by weight of cobalt, 0.15% to 0.40% by weight of potassium, 0.10% to 0.20% by weight of calcium, and 0.10% to 0.20% by weight of zirconium, the resulting surface-coating compositions have excellent drying characteristics and hardness and undergo little loss of dry, pH drift, or discoloration on aging. They also have excellent water-resistance, solvent-resistance, and adhesion to various substrates.

The drier system of this invention can be used to accelerate the drying and hardening of a wide variety of water-borne surface-coating compositions including paints, enamels, varnishes, and the like that contain an oxidizable organic film-forming resinous vehicle. The vehicle may be, for example, an alkyd resin, an unsaturated polyester, a drying oil, a urethane, or an oleoresinous varnish. It is preferably a water-dispersible or water-soluble alkyd resin. Such alkyd resins can be produced, for example, from trimethylpentanediol, isophthalic acid, trimellitic anhydride, and tall oil fatty acids or from pentaerythritol, phthalic anhydride, tall oil fatty acids, and polyethylene glycol. For use in water-borne surface-coating compounds, it is preferred that the alkyd resins have acid numbers in the range of 5 to 60, hydroxyl numbers in the range of 200 to 260, and a fatty acid content in the range of 25% to 85% by weight of said resin and that they be neutralized with ammonia or with an amine, for example, trimethylamine, triethylamine, monoethanolamine, diethanolamine, dimethanolamine, aminomethylpropanol, to a pH in the range of 7 to 10, preferably with ammonia or triethylamine to a pH in the range of 7.5 to 8.5.

The drier systems that comprise a cobalt salt-potassium salt complex may be added to the water-borne surface-coating composition at any time during its production. They are preferably added to the resinous vehicle before the vehicle is combined with the other ingredients of the compositions.

In addition to the resinous vehicle, water, and drier system, the water-borne surface-coating compositions of this invention may contain pigments, dyes, extenders, plasticizers, surfactants, stabilizers, defoamers, fungicides, levelling agents, organic solvents, and other additives commonly used in surface-coating compositions in the amounts ordinarily used for the purposes indicated.

The invention is further illustrated by the following examples. In these examples, all parts are parts by weight and all percentages are percentages by weight.

EXAMPLE 1

A white gloss enamel was prepared by grinding the following materials together using a high speed mill:

|  | Parts |
| --- | --- |
| Water-dispersible alkyd resin (Spencer Kellogg's Kelsol 3902) | 286.3 |
| Titanium dioxide (duPont's Ti-Pure R-900) | 286.3 |
| Water | 437.2 |
| Butyl Cellosolve | 22.5 |
| Ammonium Hydroxide (28%) | 15.6 |

This enamel had a pH of 8.5, viscosity of 135 KU, and a total solids content of 47.6%.

To portions of the enamel were added either a drier system of this invention or a comparative drier system. The following drier systems were used in these tests:

A. A solution of cobalt octoate-potassium octoate complex in a mixture of mineral spirits, isodecanol, octoic acid, and water that contained 3.75% Co and 6.25% K.

B. A blend of the solution of cobalt octoate-potassium octoate complex described in paragraph A and a water-dispersible drier system containing calcium naphthenate, zirconium naphthenate, surfactant, and 50% by weight of butyl cellosolve.

C. A comparative drier system that comprised cobalt and manganese salts of $C_{8-12}$ branched-chain synthetic acids and 1,10-phenanthroline.

D. A comparative water-dispersible drier system that comprised cobalt naphthenate, zirconium naphthenate, calcium naphthenate, surfactant, and 50% by weight of butyl cellosolve.

The through-dry times of the freshly-prepared compositions and of compositions that had been aged for one month were measured on 2-mil wet films at 21° C. and 50% relative humidity using Gardner Improved Circular Dry Time Recorders. The metal contents of the water-borne surface-coating compositions and their drying times are shown in Table I.

TABLE I

| Drier System | % Metal Based on Vehicle Solids | Through Dry Time (Hours) | |
| --- | --- | --- | --- |
| | | Initial | After 1 Month |
| A | 0.15 Co 0.25 K | 7 | 7 |
| B | 0.11 Co 0.19 K 0.15 Ca 0.15 Zr | 5 | 6 |
| C (Comparative Example) | 0.10 Co 0.10 Mn 0.53 1,10-phen-anthroline | 8 | 11 |
| D (Comparative Example) | 0.05 Co 0.15 Ca 0.15 Zr | 10 | 12 |

EXAMPLE 2

A white gloss enamel was prepared by grinding the following materials together:

|  | Parts |
|---|---|
| Water-dispersible alkyd resin (Spencer Kellogg's Kelsol 3902) | 286.3 |
| Titanium Dioxide (duPont's Ti-Pure R-900) | 286.3 |
| Water | 437.2 |
| Butyl Cellosolve | 22.5 |

This enamel was neutralized with ammonia to a pH of 8.0.

To portions of the enamel were added either a drier system of this invention or a comparative drier.

The following drier systems were used in these tests:
A. A solution of the cobalt octoate-potassium octoate complex in a mixture of mineral spirits, isodecanol, water, and octoic acid that contained 4.5% Co and 7.5% K.
E. A solution of cobalt octoate in mineral spirits (6% Co).
F. A solution of potassium octoate in isodecanol (10% K).

The ease of incorporation of the drier systems into the enamel, that is, the time after drier addition required for resin clarity, the color of the resulting films and the drying times of the compositions are given in Table II.

From the data in Table II, it will be seen that the drier system that contains the cobalt salt-potassium salt complex is more effective than either the cobalt drier or the potassium drier in the water-borne alkyd resin compositions, that this drier system is readily incorporated into the composition, and that films of the composition that contain this drier system have excellent color.

TABLE II

| Drier System | % Metal Based on Vehicle Solids | Through Dry Time (Hours) Initial | Through Dry Time (Hours) After 1 Month | Film Appearance | Ease of Incorporation |
|---|---|---|---|---|---|
| A | 0.15 Co 0.25 K | 8 | 8 | Trace yellow | 30 sec. |
| E (Comp. Ex.) | 0.2 Co | 12 | 16 | Slightly yellow | 180 sec. |
| F (Comp. Ex.) | 0.3 K | >24 | >24 | Trace yellow | Immediately |

EXAMPLE 3

A series of white gloss enamels was prepared by the procedure described in Example 1 except that different commercially-available water-borne resins were used.

To portions of the enamels were added either a drier system of this invention or a comparative drier system. The resins and drier systems that were used and the results obtained are given in Table III.

The data in Table III demonstrate that the drier systems of this invention are generally more effective than the comparative drier systems in water-borne surface-coating coating compositions and that they are more stable as is shown by the fact that the compositions containing them undergo less loss of dry on aging.

TABLE III

| Drier System | % Metal Based on Vehicle Solids | Through Drying Time (Hours) Resin Used in Preparation of Enamel* A | B | C | D | E | F | G |
|---|---|---|---|---|---|---|---|---|
| A | 0.15 Co 0.25 K Initial | 3 | 3 | 2 | 8 | 8 | 7 | 7 |
|  | After 1 Month at 50° C. | 5 | 5 | 6 | 8 | 10 | 7 | 8 |
| C (Comparative Example) | 0.10 Co 0.10 Mn 0.53 1,10-Phenanthroline Initial | 4 | 4 | 5 | 10 | 15 | 7 | 18 |
|  | After 1 Month at 50° C. | 9 | 9 | 8 | 13 | 21 | 10 | 20 |
| G (Comparative Example) | 0.10 Co 0.15 Ca 0.15 Zr Initial | 2 | 2 | 10 | 9 | 14 | 6 | 10 |
|  | After 1 Month at 50° C. | 6 | 6 | 12 | 9 | 16 | 6 | 12 |

*A - Kelsol 3920  E - Cargill 7440
B - Kelsol 3921  F - Beckosol 92-100
C - Spensol F-71  G - R.U. WR-4001-BC-70
D - Aquamac 1085

What is claimed is:

1. A water-borne surface-coating composition that comprises an oxidizable organic film-forming resinous vehicle, water, and a drier system that comprises a complex that is the product of the reaction of a cobalt salt of a monocarboxylic acid having 2 to 24 carbon atoms with a potassium salt of a monocarboxylic acid having 2 to 24 carbon atoms in amounts that will provide 2 moles of said potassium salt per mole of said cobalt salt in a solvent mixture that contains from 20% to 80% by weight of polar solvent and 20% to 80% by weight of non-polar solvent, said drier system having a total metal content of from 5% to 14% by weight and being present in an amount that will provide from 0.075% to 0.375% by weight of cobalt and from 0.125% to 0.625% by weight of potassium, based on the weight of said resinous vehicle.

2. A water-borne surface-coating composition as defined in claim 1 that contains from 0.10% to 0.25% by weight of cobalt and 0.15% to 0.40% by weight of potassium, based on the weight of said resinous vehicle.

3. A water-borne surface-coating composition as defined in claim 1 wherein the drier system has a total metal content of from 8% to 12% by weight.

4. A water-borne surface-coating composition as defined in claim 1 wherein the drier system comprises a complex that is the product of the reaction of a cobalt salt of a monocarboxylic acid having 8 to 12 carbon atoms with a potassium salt of a monocarboxylic acid having 8 to 12 carbon atoms in a solvent mixture that contains from 40% to 60% by weight of polar solvent and 40% to 60% by weight of non-polar solvent.

5. A water-borne surface-coating composition as defined in claim 1 wherein the drier system comprises said cobalt salt-potassium salt complex, a calcium salt, and a zirconium salt, said calcium salt and zirconium salt being salts of acids selected from the group consisting of aliphatic branched-chain monocarboxylic acids having 6 to 24 carbon atoms, cycloaliphatic monocarboxylic acids having 6 to 10 carbon atoms, and mixtures thereof.

6. A water-borne surface-coating composition as defined in claim 5 wherein said calcium salt and zirconium salts are salts of acids selected from the group consisting of aliphatic branched-chain monocarboxylic acids having 8 to 18 carbon atoms, naphthenic acids, and mixtures thereof.

7. A water-borne surface-coating composition as defined in claim 5 that contains from 0.075% to 0.375% by weight of cobalt, 0.125% to 0.625% by weight of potassium, 0.02% to 0.30% by weight of calcium, and 0.02% to 0.30% by weight of zirconium, based on the weight of said resinous vehicle.

8. A water-borne surface-coating composition as defined in claim 5 that contains from 0.10% to 0.25% by weight of cobalt, 0.15% to 0.40% by weight of potassium, 0.10% to 0.20% by weight of calcium, and 0.10% to 0.20% by weight of zirconium, based on the weight of said resinous vehicle.

9. A water-borne surface-coating composition as defined in claim 1 wherein the resinous vehicle is an alkyd resin.

10. A water-borne surface-coating composition as defined in claim 1 wherein the resinous vehicle is an unsaturated polyester.

* * * * *